United States Patent
Duan et al.

(10) Patent No.: US 7,232,557 B2
(45) Date of Patent: Jun. 19, 2007

(54) METHOD FOR PREPARATION OF MAGNETIC SPINEL FERRITES FROM LAYERED DOUBLE HYDROXIDE PRECURSORS

(75) Inventors: Xue Duan, Beijing (CN); Feng Li, Beijing (CN); Junjie Liu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 228 days.

(21) Appl. No.: 11/040,533

(22) Filed: Jan. 21, 2005

(65) Prior Publication Data

US 2005/0129609 A1    Jun. 16, 2005

Related U.S. Application Data

(63) Continuation-in-part of application No. PCT/CN03/00597, filed on Jul. 25, 2003.

(30) Foreign Application Priority Data

Jul. 29, 2002    (CN) .................. 2002 1 0025685

(51) Int. Cl.
*C01G 1/00*    (2006.01)
*C01G 49/00*    (2006.01)

(52) U.S. Cl. ................. 423/594.1; 423/594.2; 423/599; 423/594.14; 423/594.3; 423/594.4; 423/594.16; 423/594.5; 423/594.6; 252/62.56; 252/62.64

(58) Field of Classification Search ............. 423/594.1, 423/594.2, 599, 594.14, 594.3, 594.4, 594.16, 423/594.5, 594.6; 252/62.56, 62.64
See application file for complete search history.

(56) References Cited

U.S. PATENT DOCUMENTS

| | | | |
|---|---|---|---|
| 4,677,082 A | 6/1987 | Alford et al. | |
| 5,302,306 A * | 4/1994 | Nagata et al. | 252/62.62 |
| 5,538,657 A | 7/1996 | Ogata et al. | |
| 5,698,131 A * | 12/1997 | Saitou et al. | 252/62.57 |
| 5,750,045 A * | 5/1998 | Nihira et al. | 252/62.56 |

FOREIGN PATENT DOCUMENTS

CN    1413945    4/2003

OTHER PUBLICATIONS

PCT International Search Report dated Nov. 13, 2003.

* cited by examiner

*Primary Examiner*—Timothy C. Vandy
(74) *Attorney, Agent, or Firm*—Ohlandt, Greeley, Ruggiero & Perle L.L.P.

(57) ABSTRACT

The invention describes a method of preparing magnetic ferrites from layered precursors in which $Fe^{2+}$ is first introduced into the layers of layered double hydroxides (LDHs) in order to prepare $Me-Fe^{2+}-Fe^{3+}$ LDHs, and then by utilizing the easily oxidized nature of $Fe^{2+}$, binary or multi-component ferrite materials containing $Fe^{3+}$ in a single crystalline phase can be prepared. Values of the saturation magnetization of ferrites prepared by the method are significantly increased compared with ferrites prepared by traditional methods. Because the metal elements in the layered precursor have the characteristics of a high degree of dispersion, high activity and small particle size (average particle size 40-200 nm), no milling is required before calcination, thus simplifying the production process, shortening the production period, reducing capital investment in equipment and economizing on energy costs. In addition, the method does not corrode production equipment and does not pollute the environment.

2 Claims, No Drawings

METHOD FOR PREPARATION OF MAGNETIC SPINEL FERRITES FROM LAYERED DOUBLE HYDROXIDE PRECURSORS

CROSS REFERENCE TO RELATED PATENT APPLICATIONS

This application is a Continuation-in-Part (CIP) of International PCT Application Number PCT/CN03/00597 filed on Jul. 25, 2003, which claimed the benefit of prior Patent Application No. 02125686.3 of the People's Republic of China, which was filed on Jul. 29, 2002.

FIELD OF THE INVENTION

This invention relates to a method of preparation of magnetic spinel ferrites from layered double hydroxide precursors.

BACKGROUND OF THE INVENTION

Ferrites are a type of novel non-metallic magnetic materials, widely used in areas such as broadcasting communication, navigation radar, cosmic navigation, medicine and biology. Since the 1940's, knowledge of the materials has developed rapidly and they have been widely applied. Ferrites are mixed oxides composed of iron and other one or two metals, such as spinel ferrites with the chemical formula $MeFe_2O_4$, wherein Me is a divalent ion ($Mn^{2+}$, $Zn^{2+}$, $Cu^{2+}$, $Ni^{2+}$, $Mg^{2+}$, $Co^{2+}$, etc.) which has similar ionic radius to the divalent iron ion. Therefore, various spinel ferrites with binary- or multi-component ions can be obtained by changing the identity and amount of metal ions.

At present, ferrites are synthesized mainly via the calcination of mixtures of metal oxides or hydroxides or other precipitated mixtures. Because of poor activity, low mixture uniformity and large particle sizes in the cases of these raw materials as calcination precursors, there are some shortcomings in this preparation process such as it being difficult to ensure complete reaction and poor sample uniformity. Faced with this situation, others have modified the preparation art. In the papers of C. Jovalekic, M. Zdujic, A. Radakovic, and M. Mitic., Mater. Lett. 24, 365 (1995) and J. Ding, H. Yang, W. F. Miao, P. G. McCormick, and R. Street., J. Alloys Compd. 221, 959 (1995), nano spinel ferrites with dispersion of cations differing from that obtained by traditional methods were synthesized through high energy grinding. However, due to use of mixtures of materials as calcination precursors and the lack of mixture uniformity it is very difficult to further improve the magnetic properties of the ferrites.

DESCRIPTION OF THE INVENTION

This invention provides a method to obtain ferrites by preparing a single compound with sample uniformity, adjustable chemical composition and microscopic structure, which has high efficacy as a calcination precursor giving ferrites having desirable magnetic properties and narrow particle size distribution.

Layered double hydroxides (LDHs) are a class of nano-sized inorganic functional materials with a layered structure, which have the general formula $[M^{2+}_{1-x}M^{3+}_x(OH)_2]^{x+}(A^{n-})_{x/n} \cdot mH_2O$, wherein $M^{2+}$ is a divalent metal cation such as $Mg^{2+}$, $Fe^{2+}$, $Co^{2+}$, $Cu^{2+}$, $Ni^{2+}$, or $Zn^{2+}$ and $M^{3+}$ is a trivalent metal cation such as $Al^{3+}$, $Cr^{3+}$, $Ga^{3+}$, $Mn^{3+}$ or $Fe^{3+}$; $A^{n-}$ can be an inorganic or organic anion or a complex anion and examples include $CO_3^{2-}$, $SO_4^{2-}$, $NO_3^-$, $F^-$, $Cl^-$, $PO_4^{3-}$, $C_6H_4(COO)_2^{2-}$, The value of x is in the range 0.1-0.5. In the crystal structure of the LDH, the influence of crystal lattice energy minimization and crystal lattice orientation means that metal ions are distributed uniformly in the layers in a certain way, i.e. in each microstructural unit on a layer, the chemical composition and structure is invariant. Because the chemical composition and structure of LDHs can be adjusted and is uniform, it is a two-dimensional nanostructured material. This kind of material is a precursor material for the synthesis of ferrites with excellent magnetic properties. Therefore introduction of potential magnetic species into the layers allows the preparation of LDHs with a layered structure and the composition: $[Me^{II}_{(1-Y)(1-X)}Fe^{II}_{Y(1-X)}Fe^{III}_X(OH)_2]^{X+}(A^{n-})_{X/n}$, wherein $X=0.2~0.33$, $X+Y-XY=\frac{2}{3}$, $A^{n-}$ is $CO_3^{2-}$, $NO_3^-$, $OH^-$, $SO_4^{2-}$; Me is Mn, Zn, Cu, Ni, Mi, Mg, Co. Using these materials as precursors in a high temperature calcination process affords spinel ferrites whose microstructure is completely uniform and magnetism is significantly increased. This result is impossible to realize via traditional methods of preparing ferrites.

This invention involves the preparation of ferrite materials with binary- or multi-components with a single crystal phase by means of introducing $Fe^{2+}$ in the LDH layers in order to prepare $Me-Fe^{2+}-Fe^{3+}$ LDH compounds. By making use of the property whereby $Fe^{2+}$ is easily oxidized, calcining at high temperature results in the formation of $Fe^{3+}$ ions.

Preparation Method:

A. According to the ratio that the sum of the amount in moles of divalent iron ion and trivalent iron ion is twice that of $Me^{2+}$, prepare a soluble salt mixture including the divalent metal ion $Me^{2+}$, divalent iron ion and trivalent iron ion wherein the molar concentration of these metal ions is: $Me^{2+}$ 0.1-0.6 M, $Fe^{2+}$ 0.1-0.6 M, $Fe^{3+}$ 0.1-0.6 M; prepare alkali mixtures with sodium hydroxide and a soluble inorganic salt, wherein the sodium hydroxide concentration is 1.0-2.5 M and sodium salt concentration is 0-1.7 M; the solvent used to prepare the above-mentioned two mixtures is $N_2$-saturated deionized water; $Me^{2+}$ is a divalent metal ion whose ionic radius is similar that of $Fe^{2+}$;

B. Under the protection of an $N_2$ atmosphere, the alkali mixture is slowly added dropwise to the mixed salt solution until the pH value of the system reaches 7-12 and addition of alkali mixture is then stopped. Under the protection of an $N_2$ atmosphere, aging is carried out for 5-25 h at 20-65° C., the mixture is then filtered and cooled, washed and dried in order to obtain the $Me^{2+}-Fe^{2+}-Fe^{3+}$ layered double hydroxides (LDH);

C. The above LDH is placed in a high temperature oven, the temperature raised to 850-1150° C. at 2-15° C./min, and the sample calcined for 2-7 h, in order to obtain the $MeFe_2O_4$ ferrite.

In step A, the anion in the salt mixture is any one or two of $Cl^-$, $NO_3^-$ or $SO_4^{2-}$; wherein $Me^{2+}$ can be any one or several of $Mn^{2+}$, $Co^{2+}$, $Ni^{2+}$, $Mg^{2+}$; the soluble inorganic sodium salt is any one of sodium carbonate, sodium sulfate or sodium chloride;

In step B, the sample is washed with $N_2$-saturated deionized iced water until the washings are neutral. The sample is then washed 2-4 times with alcohol at 0-10° C.

This invention has the following key characteristics: 1. The as-prepared layered precursors of the ferrites have structural uniformity, adjustable composition and structure and high activity, without the shortcomings of low mixture uniformity, poor activity and superfine particle size; 2. The saturation magnetization of as-prepared materials is significantly enhanced (see Table 1); 3. As-prepared ferrites using this method have the characteristics of uniform dispersion of cations and narrow particle size (average particle size 40-200 nm); 4. It is not necessary to mill samples before calcination, so simplifying the production art, shortening the production period, saving on investment in equipment and significantly economizing on energy costs; 5. The process does not corrode the production equipment, does not pollute the environment and can be adapted to industrial production.

TABLE 1

Saturation magnetization of binary soft magnetic ferrites (at room temperature)

| Spinel | σ (emu/g) (traditional method) | σ (emu/g) (this invention) |
|---|---|---|
| $MnFe_2O_4$ | 80 | 101 |
| $CoFe_2O_4$ | 80 | 96 |
| $NiFe_2O_4$ | 50 | 66 |
| $CuFe_2O_4$ | 25 | 32 |
| $MgFe_2O_4$ | 27 | 38 |

The following examples disclose formulas according to the present invention that are illustrative only and are not intended to limit the scope of the present invention in any way.

EMBODIMENT

EXAMPLE 1

A mixture of $Mg(NO_3)_2$, $Fe(NO_3)_3$ and $FeCl_2$ in $N_2$-saturated deionized water was prepared, wherein the metal ion concentrations were: $Mg^{2+}$ 0.2 M, $Fe^{2+}$ 0.2 M and $Fe^{3+}$ 0.2 M, and then poured into a container. Under the protection of an $N_2$ atmosphere, a mixed alkali solution consisting of 1.2 M sodium hydroxide and 0.6 M sodium carbonate was slowly added dropwise until the pH value reached 11.5. Then under the protection of an $N_2$ atmosphere, the mixture was aged for 8 h in a water bath at 20° C. and filtered, washed with $N_2$-saturated deionized iced water, and then twice with alcohol at 0° C. and dried, in order to obtain the $Mg^{2+}$—$Fe^{2+}$—$Fe^{3+}$—$CO_3^{2-}$ layered double hydroxide (LDH). The LDH was placed in a muffle oven and the temperature raised to 950° C. at 2° C./min and the temperature maintained for 4 h. The mixture was cooled to room temperature in order to obtain $MgFe_2O_4$ ferrite. Its measured saturation magnetization was 38 emu/g and particle size 58 nm. By Mossbauer spectroscopy, it was found that $Fe^{2+}$ had been completely oxidized to $Fe^{3+}$ during the calcination process.

EXAMPLE 2

An mixed inorganic salt solution containing $Ni(NO_3)_2$, $Fe(NO_3)_3$ and $FeCl_2$ was prepared, wherein the molar concentration of metal ions was: $Ni^{2+}$ 0.4 M, $Fe^{2+}$ 0.5 M and $Fe^{3+}$ 0.3 M. A sodium salt mixture, wherein the molar concentration of sodium hydroxide was 2.4 M and that of sodium carbonate 1.6 M, was added dropwise to the mixed salt solution, until the pH value reached 9.5. Following the procedure in example 1, the aging conditions were: 25 h at 60° C. in a water bath. Calcination conditions were: maximum temperature of 1150° C., rate of temperature increase 10° C./min, maintaining the temperature for 7 h. The resulting $NiFe_2O_4$ ferrite had a saturation magnetization of 66 emu/g and particle size of 102 nm.

EXAMPLE 3

A mixed inorganic salt solution containing $Mn(NO_3)_2$, $Fe_2(SO_4)_3$ and $FeCl_2$ was prepared, wherein the molar concentration of metal ions was: $Mn^{2+}$ 0.25 M, $Fe^{2+}$ 0.25 M and $Fe^{3+}$ 0.25 M. A sodium salt mixture, wherein the molar concentration of sodium hydroxide was 2.0 M and that of sodium sulfate 1.5 M, was added dropwise to the mixed salt solution, until the pH value reached 9.5. Following the procedure in example 1, the aging conditions were: 5 h at 65° C. in a water bath. Calcination conditions were: maximum temperature of 850° C., rate of temperature increase 15° C./min, maintaining the temperature for 7 h. The resulting $MnFe_2O_4$ ferrite had a saturation magnetization of 101 emu/g and a particle size of 180 nm.

EXAMPLE 4

A mixed inorganic salt solution containing $Co(NO_3)_2$, $Mg(NO_3)_2$, $Fe(NO_3)_3$ and $FeCl_2$ was prepared, wherein the molar concentration of metal ions was: $Co^{2+}$ 0.24 M, $Mg^{2+}$ 0.16 M, $Fe^{2+}$ 0.40 M and $Fe^{3+}$ 0.40 M. A sodium salt mixture, wherein the molar concentration of sodium hydroxide was 1.7 M and that of sodium chloride 0.8 M, was added dropwise to the mixed salt solution, until the pH value reached 9.0. Following the procedure in example 1, the aging conditions were: 20 h at 55° C. in a water bath. Calcination conditions were: maximum temperature of 950° C., rate of temperature increase 15° C./min, maintaining the temperature for 6 h. The resulting $Co_{0.6}Mg_{0.4}Fe_2O_4$ ferrite had a saturation magnetization of 76 emu/g and a particle size of 87 nm.

EXAMPLE 5

A mixed inorganic salt solution containing $Ni(NO_3)_2$, $Cu(NO_3)_2$, $Fe(NO_3)_3$ and $FeCl_2$ was prepared, wherein the molar concentration of metal ions was: $Ni^{2+}$ 0.12 M, $Cu^{2+}$ 0.12 M, $Fe^{2+}$ 0.24 M and $Fe^{3+}$ 0.24 M. A sodium salt mixture, wherein the molar concentration of sodium hydroxide was 1.2 M and that of sodium sulfate 0.3 M, was added dropwise to the mixed salt solution, until the pH value reached 8.0. Following the procedure in example 1, the aging conditions were: 8 h at 55° C. in a water bath. Calcination conditions were: maximum temperature of 1000° C., rate of temperature increase 15° C./min, maintaining the temperature for 6 h. The resulting $Ni_{0.5}Cu_{0.5}Fe_2O_4$ ferrite had a saturation magnetization of 54 emu/g and a particle size of 158 nm.

EXAMPLE 6

A mixture of $Mn(NO_3)_2$, $CoSO_4$, $Fe(NO_3)_3$ and $FeSO_4$ in $N_2$-saturated deionized water was prepared, wherein the metal ion concentrations were: $Co^{2+}$ 0.2 M, $Mn^{2+}$ 0.2 M, $Fe^{2+}$ 0.4 M and $Fe^{3+}$ 0.4 M. A mixed alkali solution consisting of 1.5 M sodium hydroxide and 0.5 M sodium chloride was slowly added dropwise under the protection of an $N_2$ atmosphere until the pH value reached 8.0. Then under the protection of an $N_2$ atmosphere, the mixture was aged for 8 h in a water bath at 28° C. and filtered, washed with $N_2$-saturated deionized ice water; and then twice with alcohol at 10° C. and dried, in order to obtain the $Mn^{2+}$—$Co^{2+}$—$Fe^{2+}$—$Fe^{3+}$—$CO_3^{2-}$ layered double hydroxide (LDH). The LDH was placed in a muffle oven and the temperature raised to 850° C. at 2° C./min and the temperature maintained for 6 h. The mixture was cooled to room temperature in order to obtain $Mn_{0.5}Co_{0.5}Fe_2O_4$ ferrite. Its measured saturation magnetization was 94 emu/g and particle size 78 nm.

The present invention having been thus been described with particular reference to the preferred forms thereof, it will be obvious that various changes and modifications may be made therein without departing from the spirit and it will be obvious that various changes and modifications may be made therein without departing from the spirit and scope of the present invention as defined in the appended claims.

What is claimed is:

1. A method for preparation of magnetic spinel ferrites from layered double hydroxide precursors comprising the steps of:

adding an alkali solution slowly dropwise to a mixed salt solution under an $N_2$ atmosphere until the pH of the mixture of said alkali solution and said salt solution reaches about 7 to about 12, resulting in the production of a precipitate;

aging said precipitate for about 5 to 25 hours at about 20° C. to 65° C.;

cooling said precipitate by adding $N_2$-saturated deionized iced water;

filtering and washing said precipitate with $N_2$-saturated deionized water to neutrality;

further filtering and washing with ethanol 2 to 4 times at about 0° C. to about 10° C., resulting in a gelatinous precipitate;

drying said gelatinous precipitate at room temperature to produce $Me^{2+}$—$Fe^{2+}$—$Fe^{3+}$ layered double hydroxides (LDH) precursors; and calcining said LDH precursors in air at about 850° C. to about 1150° C. for about two to seven hours with a temperature increasing rate of about 2° C. to about 15° C./min to obtain magnetic spinel ferrites, wherein said alkali solution comprises about 1.0 M to about 2.5 M of sodium hydroxide, up to 1.7 M of sodium salt, and $N_2$-saturated deionized water, wherein said mixed salt solution comprises about 0.1 M to about 0.6 M of $Me^{2+}$, about 0.1 M to about 0.6 M of $Fe^{2+}$, and about 0.1 M to about 0.6 M $Fe^{3+}$, and wherein said $Me^{2+}$ has similar ionic radius as said $Fe^{2+}$ and is one or two divalent metal ions selected from the group consisting of $Mn^{2+}$, $Zn^{2+}$, $Cu^{2+}$, $Ni^{2+}$, $Mg^{2+}$ or $Co^{2+}$, and wherein the sum of the moles of said $Fe^{2+}$ and said $Fe^{3+}$ is twice that of said $Me^{2+}$.

2. The method for preparation of magnetic spinel ferrites from layered double hydroxide precursors according to claim 1, wherein said salt solution has an anion that is selected from the group consisting of one or two salts of $Cl^-$, $NO_3^-$ and $SO_4^{2-}$, and wherein said sodium salt is selected from the group consisting of sodium carbonate, sodium sulfate, and sodium chloride.

* * * * *